Patented Oct. 30, 1934

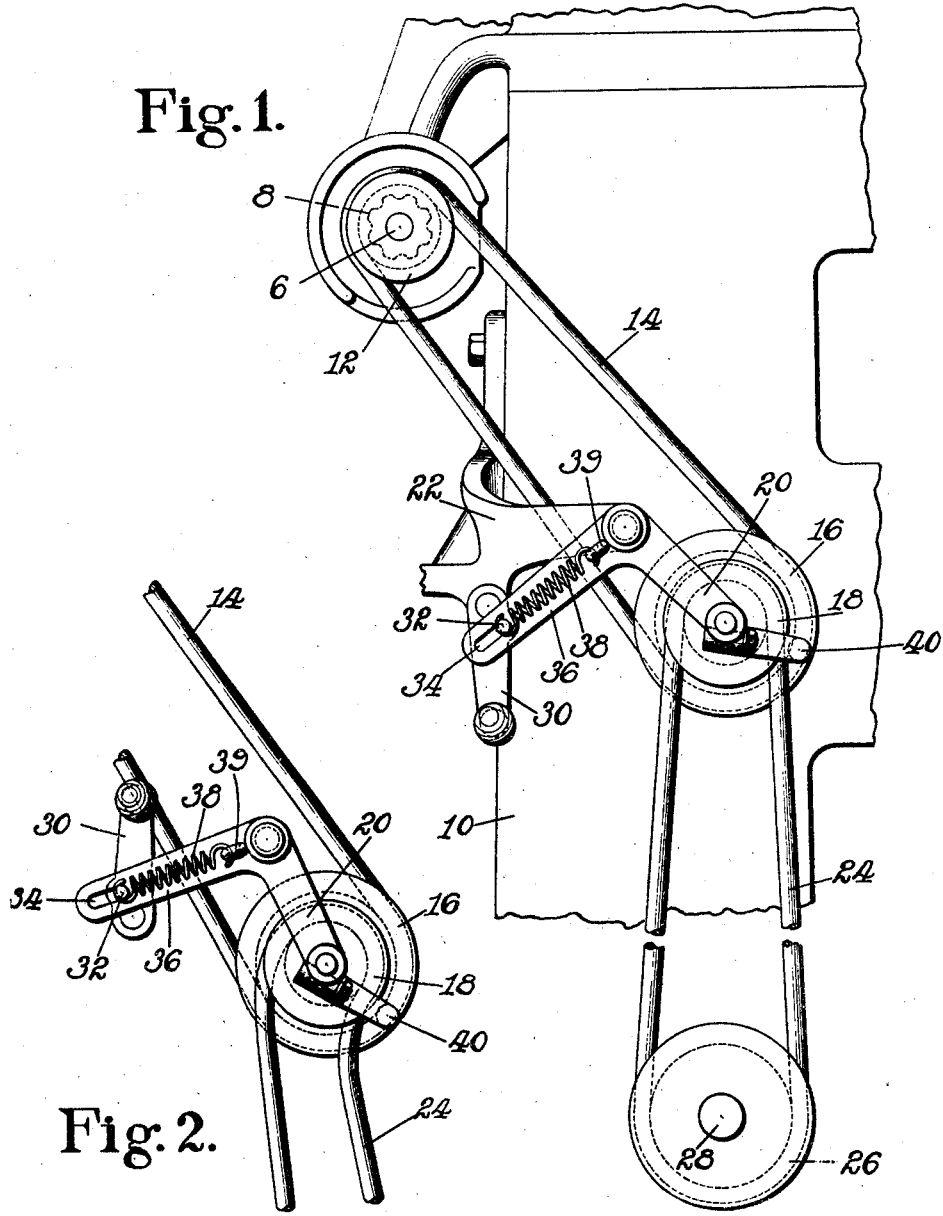

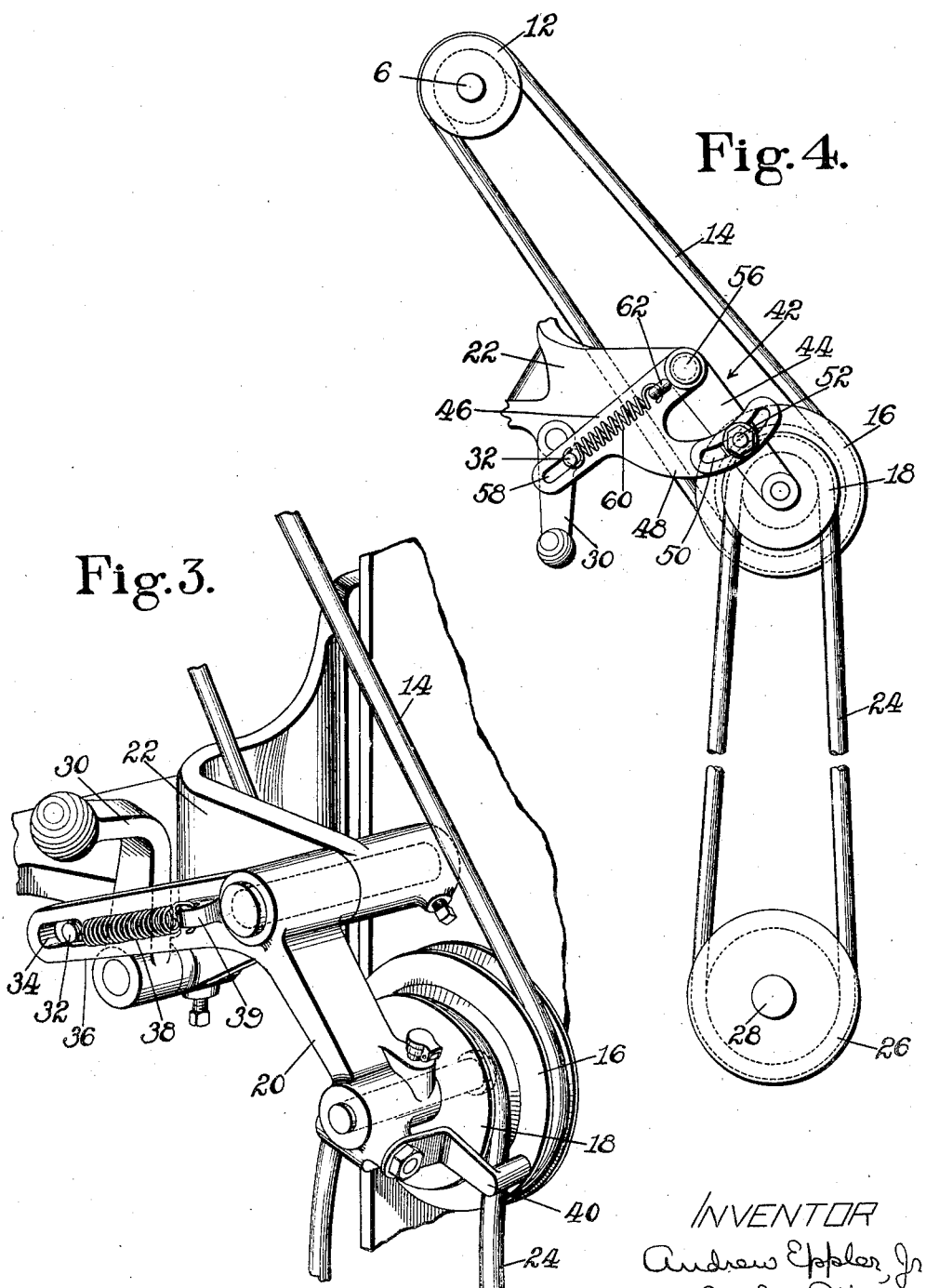

1,978,526

UNITED STATES PATENT OFFICE 1,978,526

DRIVING MECHANISM

Andrew Eppler, Jr., Lynn, Mass., assignor to United Shoe Machinery Corporation, Paterson, N. J., a corporation of New Jersey Application May 25, 1932, Serial No. 613,449
In Great Britain February 6, 1932

8 Claims. (Cl. 308—13)

This invention relates to improvements in mechanism for transmitting rotary motion from a driving member to another member which is to be driven therefrom. The invention is herein illustrated as embodied in mechanism for driving a rotary tool shaft from a continuously rotating power shaft and comprising novel manually operable means for establishing and interrupting operative driving connections between the shafts.

One object of the present invention is to provide simple and reliable driving mechanism of the character above indicated which shall be especially adapted for use in cases where a tool or other operating shaft is located a substantial distance away from a power shaft from which it is to be driven but must be capable of being started and stopped at will.

For the accomplishment of this object a tool shaft is herein shown as being connected with a driving shaft by a novel belt drive mechanism comprising a belt passing over a pulley on the tool shaft and over a second pulley on a pivotally mounted pulley carrier, a second belt passing over a third pulley which is fixed to the second pulley and over a fourth pulley on the driving shaft, and means for moving the pulley carrier from one position in which both said belts will be tight so that the tool shaft will be rotated, to another position in which at least one of the belts will be loose so that the driving connection between the shafts will be interrupted. The illustrated means for moving the pulley carrier comprises a manually operable crank arm having a crank pin extending through a slot in the pulley carrier, the arrangement being such that when the pulley carrier is moved from one position to another, the crank pin will be moved across a line joining the pivots of the crank arm and the pulley carrier so that a spring connected with the crank pin will function, in either position of the crank arm to hold the pin against one end of the slot in the pulley carrier, and thereby retain the pulley carrier in either of its two positions.

As herein shown, the construction is such that when the pulley carrier is shifted into position to interrupt the driving connection between the shafts the belt passing over the pulley on the tool shaft will remain tight while the belt passing over the pulley on the driving shaft will be loosened. As illustrated, means is provided on the pulley carrier for engaging the belt passing over the pulley on the driving shaft, when the latter is loose, to prevent it from crawling, due to frictional engagement with the driving shaft pulley, and thus having a tendency to impart slow rotation to the operating tool. In the present instance, this means comprises a member mounted on the pulley carrier and arranged to be moved into operative engagement with the belt when the pulley carrier is shifted into position to interrupt driving connections between the shafts and to be moved clear of the belt by movement of the pulley carrier into position to establish driving connections between the shafts.

The invention further consists in features of construction and combinations and arrangements of parts hereinafter described and claimed.

The invention will be explained with reference to the accompanying drawings, in which Fig. 1 is a view in side elevation of a particular embodiment of my improved driving mechanism;

Fig. 2 is a like view of a portion of the driving mechanism showing a different position of the parts;

Fig. 3 is a perspective view of the portion of the driving mechanism shown in Fig. 2; and Fig. 4 is a side elevation of a modified form of the driving mechanism.

Referring to the drawings, a shaft 6 carrying a rotary tool 8, is journaled in bearings supported by a frame 10. Secured to one end of the shaft 6 is a pulley 12 by means of which the shaft may be rotated for the purpose of operating the tool 8. The pulley 12 is adapted to be driven by a belt 14 of circular cross-section which passes over the pulley 12 and also over a second pulley 16. The second pulley 16 has integrally formed coaxially therewith a third pulley 18 and the two pulleys 16 and 18, constituting a single pulley unit, are rotatably mounted upon a pulley carrier 20 which is in the form of a bell crank lever and is pivoted to a bracket 22 secured to the frame 10. A second belt 24 passes over the pulley 18 and over a fourth pulley 26 secured to a continuously rotating horizontal shaft 28 which may be journaled in bearings in the frame 10.

When the pulley-carrier 20 occupies the position shown in Fig. 1 the two belts 14 and 24 will be tight and the shaft 6 will be rotated. In order that the rotation of the shaft 6 may be stopped without stopping the driving shaft 28 and without shifting either of the belts 14 or 24 provision is made for moving the pulley carrier 20 with the pulleys 16 and 18 from the position shown in Fig. 1 to another position in which the upper belt 14 will still be tight but in which the lower belt 24 will be loosened so that no power will be transmitted to the tool-carrying shaft 6. For this purpose a hand-operated crank arm 30, which is pivoted to the bracket 22, carries a crank pin 32 which is received in a slot 34 in an arm 36 of the pulley carrier 20. A spring 38 is connected at one end to a lug 39 on the arm 36 and at its opposite end to the crank pin 32 on the crank arm 30. When this crank arm extends vertically downward from its pivot, as shown in Fig. 1, the pulley carrier 20 and the pulleys 16 and 18 are so positioned that the belts 14 and 24 are tight and the tool shaft 6 will be driven. When the crank arm 30 is turned so that it extends vertically upward from its pivot, as shown in Figs. 2 and 3, the pulley carrier 20 is rocked so as to loosen the lower belt 24 without, however, loosening the upper belt 14, and thus the driving of the tool shaft 6 is stopped. In moving from one position to the other the slotted arm 36 of the pulley carrier 20 moves across a line joining the pivots of the crank arm and the pulley carrier, this arrangement enabling the spring 38 to hold the crank pin 32 against one end of the slot 34 in both positions and thus to retain the pulley carrier for either tightening or loosening the belt 24.

In order to prevent the belt 24 from leaving the pulley 18 and from crawling upon the pulley 18, due to frictional engagement with the driving pulley 26 when the pulley 18 is in the position shown in Fig. 2, a finger 40 on the pulley carrier 20 is arranged to swing down and engage the belt 24 adjacent to the pulley 18. When the belt 24 is tightened the finger rises to a position clear of said belt, as shown in Fig. 1.

By employing mechanism constructed and arranged to shift the pulleys 16 and 18 as above described, it will be seen that when the tool shaft 6 is stationary, the upper belt 14 will be subjected to the same tension as when the tool shaft is being driven and that, accordingly, there will be no opportunity for said belt to become shortened as a result of shrinkage as might happen if it were left in loosened condition for prolonged periods. In case, however, it should be considered desirable to relieve the tension of the belt 14 when the tool shaft 6 is idle, a pulley carrier 42 of the modified construction shown in Fig. 4 may be employed in place of the carrier already described.

The pulley carrier 42 shown in Fig. 4 comprises two relatively adjustable arms 44 and 46, the arm 44 carrying the pulleys 16 and 18, and the arm 46 being rigidly but adjustably connected with the arm 44 by means of a curved finger 48 which is slotted, as shown at 50, to receive a bolt 52 carried by the arm 44. As shown, the slot 50 in the finger 48 is curved about the pivotal axis 56 of the pulley carrier so that upon loosening the bolt 52 the arm 44 may be adjusted to vary its angular relation to the arm 46. This modified pulley carrier is arranged to be operated to shift the positions of the pulleys 16 and 18 by means of the crank arm 30, the crank pin 32 on that arm extending through a slot 58 in the arm 46 and being acted upon by a spring 60 which is secured at one end to the crank pin 32 and at the other end to a lug 62 on the arm 46. This arrangement is such that in moving from one position to the other the slotted arm 46 moves across a line joining the pivot of the crank arm 30 and the pivot 56 of the pulley carrier 42 so that the spring 60 will hold the parts in either one position or the other as already described in connection with the operation of the pulley carrier 20. In the position of relative adjustment of the carrier arms 44 and 46 shown in Fig. 4 both belts 14 and 18 are tight and the tool shaft 6 is being driven. By shifting the carrier 42 by means of the crank arm 30 to stop the rotation of the tool shaft 6, the belt 24 is loosened while the belt 14 remains tight. By loosening the bolt 52 the angular relation of the arms 44 and 46 may be varied, so that when the crank arm 30 is raised the rotation of the tool shaft 6 will be stopped by loosening the belt 24, the belt 14 also being loosened. In employing the last-mentioned adjustment of the arm 44, a shorter belt 24 may, if necessary, be used, or a belt-tightener applied to it.

Having thus described my invention, what I claim as new and desire to secure by Letters Patent of the United States is:—

1. The combination with a driving shaft and a driven shaft, of mechanism for transmitting rotary motion from the driving shaft to the driven shaft comprising a pulley on the driving shaft, a pulley on the driven shaft, a belt passing over the pulley on the driving shaft, a second belt passing over the pulley on the driven shaft, a pulley unit receiving both said belts, an oscillatory carrier for said pulley unit movable between two positions in one of which both said belts will be tight and in the other of which at least one of said belts will be loose, said carrier having a slot therein, a crank arm for moving said carrier, a crank pin on said arm extending into said slot and arranged to move across a line extending through the pivots of the crank arm and said carrier, and a spring secured at one end to the crank pin and at its opposite end to said carrier for holding the crank pin against one end of said slot in either of said positions of said carrier thereby to hold said carrier in either of said positions.

2. The combination with a rotary driving member and a rotary driven member each having a surface adapted to receive a driving belt, of driving connections between said members comprising a third rotary member having driving belt receiving surfaces formed thereon, a belt connecting said third member with said driving member, a second belt connecting said third member with said driven member, a carrier for said third member, means for moving said carrier between two positions in one of which both said belts will be tight and in the other of which said second belt will be loose, and means on the carrier for engaging said second belt to prevent crawling of said belt when it is loose.

3. The combination with a rotary driving member and a rotary driven member each having a surface adapted to receive a driving belt, of driving connections between said members comprising a third rotary member having driving belt receiving surfaces formed thereon, a belt connecting said third member with said driving member, a second belt connecting said third member with said driven member, a carrier for said third member, means for moving said carrier between two positions in one of which both said belts will be tight and in the other of which said second belt will be loose, and means on the carrier for engaging said second belt to prevent crawling of said belt when it is loose, said means being movable into a position clear of said second belt when the latter is tight.

4. The combination with a rotary driving member and a rotary driven member each having a surface adapted to receive a driving belt, of driving connections between said members comprising a third rotary member having driving belt receiving surfaces formed thereon, a belt connecting said third member with said driving member, a second belt connecting said third member with said driven member, a carrier for said third member comprising a bell crank lever one arm of which carries said third rotary member and is adjustable relatively to the other arm of said lever to vary the angle between said lever arms, and means for moving said carrier between two positions in one of which both said belts will be tight and in the other of which at least one of said belts will be loose.

5. The combination with two shafts, of a pulley carried by each shaft, a movable carrier having a slot, pulleys rotatable upon the carrier, belts joining the carrier pulleys to the respective shaft pulleys, a crank arm provided with a projection extending into the slot in the carrier, and a tension member joining the projection to the carrier.

6. The combination with a frame, of a driving shaft and a driven shaft rotatable therein, a carrier lever fulcrumed upon the frame and having a slot, pulleys rotatable upon the lever, belts joining the lever pulleys to the pulleys of the driving and driven shafts respectively, a crank arm pivoted upon the frame and provided with a pin entering the slot in the lever, and a spring joining the pin to the lever and being movable to opposite sides of a line uniting the fulcrum of the lever and the pivotal axis of the crank arm.

7. The combination with two shafts, of a pulley carried by each shaft, a movable carrier, pulleys rotatable upon a carrier, belts joining the carrier pulleys to the respective shaft pulleys, and a belt engaging member mounted upon the carrier and movable thereby into contact with one of the belts.

8. The combination with two shafts, of a pulley carried by each shaft, a carrier lever, pulleys rotatable upon the lever, belts joining the lever pulleys to the respective shaft pulleys, and a finger projecting from the lever and movable thereby into engagement with one of the belts.

ANDREW EPPLER, Jr.